US006431468B1

(12) United States Patent
Brown et al.

(10) Patent No.: US 6,431,468 B1
(45) Date of Patent: Aug. 13, 2002

(54) SAFETY MECHANISM FOR DISPENSING APPARATUS (75) Inventors: Daniel P. Brown, Palos Park, IL (US); Michael C. Dean, Alpharetta, GA (US)

(73) Assignee: Flexible Products Company, Marietta, GA (US)

(*) Notice: Subject to any disclaimer, the term of this patent is extended or adjusted under 35 U.S.C. 154(b) by 9 days.

(21) Appl. No.: 09/706,936

(22) Filed: Nov. 6, 2000

(51) Int. Cl.[7] .............................. B05B 7/02; B05B 9/01
(52) U.S. Cl. ...................... 239/526; 239/525; 239/527; 239/414; 222/145.5
(58) Field of Search ............................... 239/525, 526, 239/527, 600, 414, DIG. 22; 222/145.5, 153.14

(56) References Cited

U.S. PATENT DOCUMENTS

| 3,971,492 A | | 7/1976 | Lockwood |
| 4,129,231 A | | 12/1978 | Larson |
| 4,166,579 A | * | 9/1979 | Beise et al. ................. 239/526 |
| 4,245,759 A | | 1/1981 | Baker et al. |
| 4,311,254 A | | 1/1982 | Harding |
| 4,550,863 A | | 11/1985 | Farrey |
| 4,676,437 A | | 6/1987 | Brown |
| 4,925,107 A | | 5/1990 | Brown |
| 4,946,074 A | | 8/1990 | Grogan |
| 5,114,049 A | | 5/1992 | Knickerbocker |
| 6,021,961 A | * | 2/2000 | Brown ....................... 239/414 |
| 6,286,723 B1 | * | 9/2001 | Sweeton et al. ....... 222/153.13 |

* cited by examiner

Primary Examiner—Robin O. Evans
(74) Attorney, Agent, or Firm—Vedder Price Kaufman & Kammholz (57) ABSTRACT A dispenser for mixing together multiple fluids, such as foam components and dispensing the mixed fluids includes a body portion of the dispenser with fluid entrances and an exit. A handle extends from the body portion to facilitate grasping and operation by a user. A flow control valve is positioned in the body portion for controlling flow of foam components entering the dispenser mixing chamber. The trigger is movably mounted to the body portion in opposition to and spaced apart from the handle. A safety for preventing unintended operation of the dispenser is movably mounted to and extends lengthwise of the trigger that is always biased into a safety position. The safety has an arm for preventing movement of the trigger sufficient to cause unintended operation of the flow control valve, and the safety may be disengaged by the same single-handed action used to actuate the dispenser to dispense the mixed fluids.

20 Claims, 5 Drawing Sheets

SAFETY MECHANISM FOR DISPENSING APPARATUS

BACKGROUND OF THE INVENTION

The present invention relates generally to dispensers and gun-like dispensing devices used in the foam industry, and more particularly, to a dispenser which is adapted for easy, low-cost mass production manufacture capable of simple, selective actuation to prevent inadvertent or unintended discharge of chemical products.

Over the last couple of decades, there has been an ever-increasing use of polyurethane and like plastic foams for a number of applications. Urethane and related products, including isocyanurates, silicones, phenolics and epoxies, are well known as having a number of desirable characteristics. These include the potential for excellent insulation, compatibility with blowing or foaming agents, reproducibility of chemical characteristics, and excellent chemical and physical properties in the finished product.

Many urethane foams are resistant to degradation by many common solvents, moisture and atmospheric oxidation. Urethanes provide the best combination of heat insulation and physical strength for a given cost. The foam is naturally an adhesive material and bonds well to any number of substrates. In this connection, it can add structural strength to many articles where such strength is an important element. Fire retardance may be achieved easily with available formulations.

Urethane foams, being the reaction product of two individual components, may be varied in chemical composition for a number of purposes. Thus, urethane foams may be formulated so as to provide a finished product which is quite rigid, which is semi-rigid, or which is somewhat flexible and/or elastomeric. Foams of the kind in question may be made with almost exclusively closed cells, or with a desired proportion of open cells.

The types of products with which the instant invention may be used are primarily the two-component and single component closed cell foam types of product used for insulation purposes in building structures as well as open-celled foam types that are commonly used for packaging applications. The components of the foam are passed at high pressures above 40–250 p.s.i. through a hand-held dispenser which serves to meter and mix the components thoroughly in a nozzle from which they are discharged. Chemical components are taken directly to a job site in pre-pressurized cylinders, or shipped in bulk tanks that utilize external pumps or other methods of pressurization. Here, the amount of product required to be dispensed is not so large as to require permanent, expensive equipment, as would be used in a factory. However, the amount of product used is significantly larger than could be accommodated by using small, individual aerosol cans, for example. The individual containers of the components carry from several pounds up to 25 to 50 pounds or more of each component. These tanks are sufficiently portable to be moved about on the job site by one worker, but yet are able to provide sufficient foam to provide several hundred or thousand board feet of coverage.

Hand-held dispensers are used with these smaller chemical supply tanks and such dispensers provide the advantages and characteristics of low cost, reliability, and safety in use.

U.S. Pat. No. 4,676,437, issued Jun. 30, 1997, and assigned to assignee of the present invention discloses a representative construction in such a hand-held dispenser. This dispenser takes the form of a gun with a trigger and a safety for preventing inadvertent discharge of the chemical components from the dispensing gun. Such discharges are unwanted and may be unsafe.

The operating pressures, reactive components and other characteristics of the foam are such that unintended discharge is unwanted. These discharges create waste that clutters up the working area. Often these discharges result from careless or improper handling when users forget or disregard resetting the safety. One disadvantage of the dispenser of the '437 patent is that manipulating the safety from an "on" position to an "off" position is and difficult and sometimes requires the use of two hands to move it. Another disadvantage is that resetting the trigger safety after use of the dispensing gun is not an automatic, or natural step taken in actuating the dispenser. The structure of this safety also makes manipulation from an "off" position to an "on" position easy to forget. Consequently, after the initial use the trigger safety is usually not moved back to an "on" position. In such situations if the gun or dispenser is inadvertently dropped during use, the trigger may be activated by the fall of the gun and foam is inadvertently discharged.

Therefore, there is a demand for a simple-to-use, automatically resetting safety on a foam dispenser which would provide the advantages and characteristics of low cost, safety and reliability in use.

The present invention is therefore directed to a safety mechanism for hand-held foam dispensers that overcomes the aforementioned disadvantages.

SUMMARY OF THE INVENTION

It is therefore a general object of the present invention to provide a foam dispenser which is adapted for easy, low-cost mass production manufacture and which includes an improved safety mechanism that is easy to use and which prevents inadvertent operation of the dispenser.

Another object of the present invention is to provide a safety for a foam dispenser which automatically resets to an "on" position after each use.

Yet another object of the present invention is to provide a safety incorporated into the trigger of a foam dispenser, which may be manipulated to an "off" position simultaneously with the trigger being grasped for effecting the discharge of foam from the dispenser.

Still yet another object of the present invention is to provide a foam dispenser having a safety extending from a grasping surface of a trigger of the dispenser such that a user may manipulate the safety and trigger with one hand in a natural grasping motion in order to actuate the discharge of foam components.

A further object of the present invention is to provide a trigger lock for a fluid dispensing apparatus, wherein apparatus has a handle, a trigger moveably mounted to the apparatus and capable of depression toward the handle to open a passage in the dispenser to permit fluid to pass through, the trigger having a lock member integrated therewith, the lock member having an actuating portion extending lengthwise of the trigger and depressible by a user, whereby depression of the lock member moves the lock member out of interference with a stop surface of the handle, so that the trigger may be fully depressed and the dispenser actuated, and the apparatus including a means for biasing the trigger into an open, non-depressed position.

The present invention accomplishes these and other objects by way of its novel and unique structure. A preferred embodiment of the present invention is characterized by a dispenser for mixing together two reactive foam components to form an expandable foam and dispensing the expandable foam, including a body portion having foam component entrances and a foam mixing chamber. A handle extends from the body portion to facilitate grasping and operation by a user. The flow control valve is located in the body portion for controlling flow of foam components entering the dispenser mixing chamber. A trigger is movably mounted to the body portion in opposition to and spaced apart from the handle. A safety latch, or trigger lock, is provided that prevents unintended operation of the dispenser. The safety is incorporated into the body of the trigger and it extends length wise of the trigger and has a projecting portion that projects past the grasping surface of the trigger. The safety is placed on the trigger so that it may be easily depressed when the trigger is grasped by a user, thereby permitting operation of the trigger. Likewise, when the user is not grasping the trigger, the safety is biased into a safety position so that even if the dispenser were to be dropped, the safety will prevent operation of the dispenser and discharge of the foam components.

An arm member is provided on the safety that extends rearwardly from the safety. The handle of the dispenser includes a stop surface and a cavity arranged adjacent to each other. When the safety is not depressed and a force is applied to the trigger, the arm member will interfere with the stop surface and prevent actuating movement of the trigger. When the trigger is grasped, the safety is automatically depressed and the arm member is moved out of opposition with the stop surface and into alignment with the handle cavity, which receives the arm member, thereby allowing full depression of the trigger by the operator.

These and other objects, features and advantages of the present invention will be clearly understood through consideration of the following detailed description.

BRIEF DESCRIPTION OF THE DRAWINGS

In the course of the following detailed description, reference will be made to the attached drawings wherein line reference numerals identify like parts and in which.

DETAILED DESCRIPTION OF THE INVENTION

Figure 10:
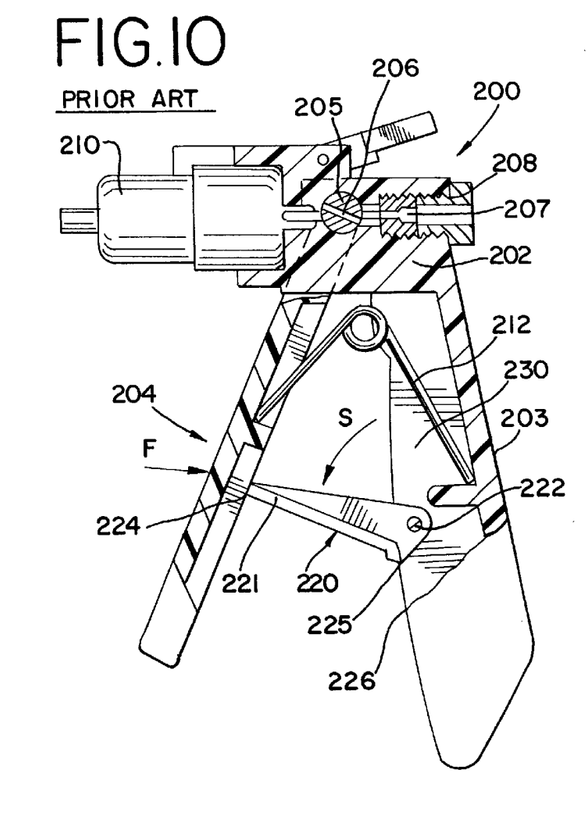

Referring first to FIG. 10, a prior art foam dispenser is shown generally at 200 and is representative of that disclosed and claimed in U.S. Pat. No. 4,676,437. In this known structure, the dispenser has a gun-like configuration with a gun body portion 202, a handle 203 extending down from the gun body 202 and a trigger 204 movably mounted to the gun body 202. The trigger is used to actuate a spool valve 205 by rotating the spool valve 205 so that internal passages 206 formed in the valve 205 are moved into alignment with passages 207 formed in two inlets 208 of the gun body 202. When so aligned, these valve passages 206 also communicate with two inlets of a mixing and dispensing nozzle portion 210 of the gun 200.

A spring 212 is provided that extends between the handle 203 and the trigger 204 and provides an outward bias to the trigger 204 so that the trigger always (in the absence of pressure exerted thereupon) stays in a ready position where the spool valve passages are not aligned with the two inlets so that foam components are unable to flow through the valve 205 and into the nozzle portion 210.

In order to provide protection against unintended operation of the gun 200 and inadvertent discharge of the foam components, this known gun 200 incorporates a safety 220 in the form of a lever 221 that is movably mounted to the handle by way of a pin 222 or other similar member.

In operation, the safety 220 is rotated manually counter-clockwise along the arrow S until the free end 224 of the lever lies in opposition to the trigger 204. Movement of the safety lever 221 is limited by a stop edge 225 that bears against the inner surface 226 of the handle 203. In this position, the safety 220 prevents movement of the trigger 204 by resisting forces applied to the trigger along the arrow F. To operate the gun 200, the safety lever 221 is moved up clockwise into a recess 230 in the handle so that the lever's interference with the complete movement of the trigger is removed.

Although effective, this safety construction has certain disadvantages. For one, the safety lever is not biased into any particular position. For two, when the safety lever 221 is moved up, it remains in an "off" position so that if the gun is accidentally dropped, the trigger 204 can fully displace to move the valve 205 to a discharge position. This accidental discharge will create a mess and waste foam.

Figures 1, 2:
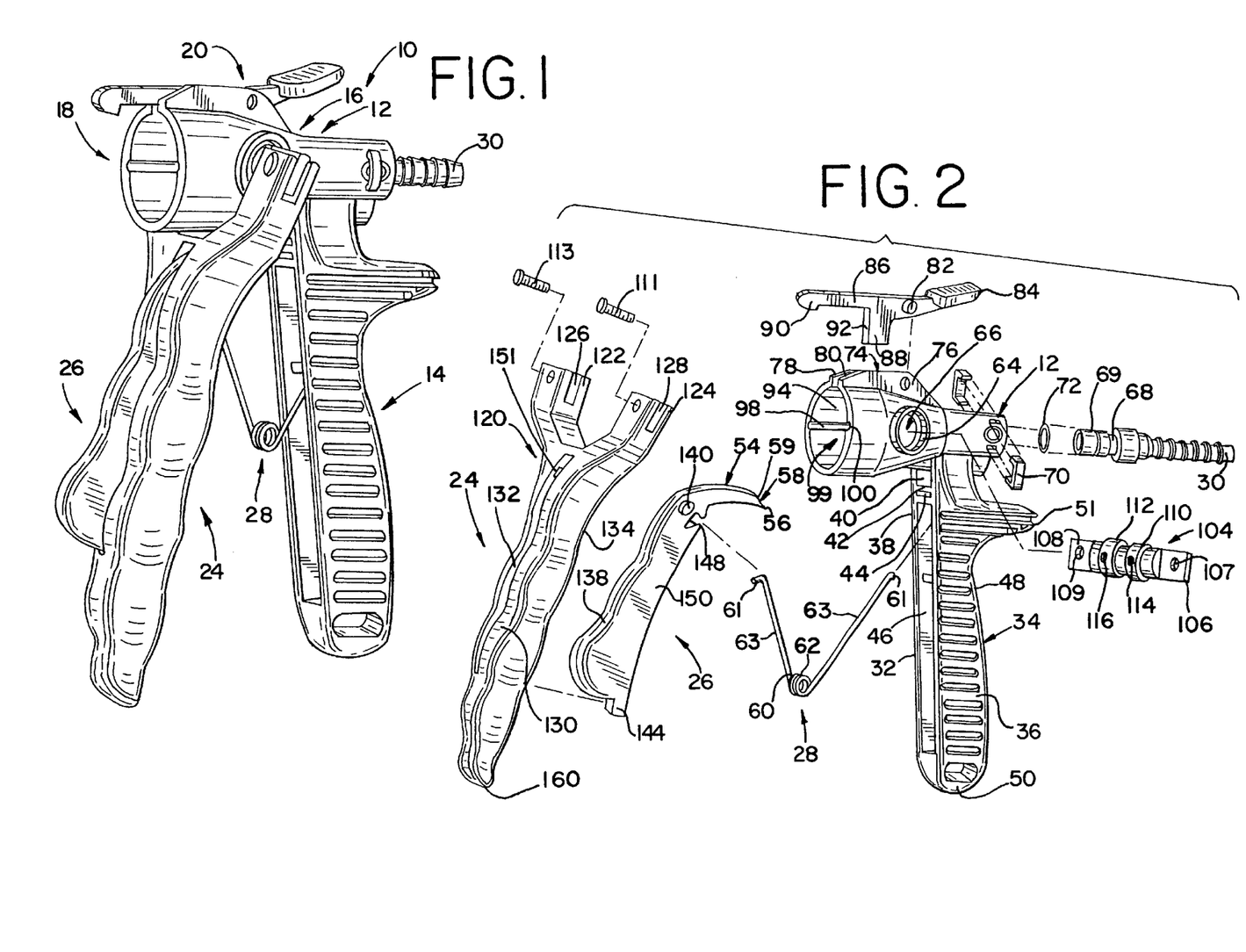
FIG. 1 is a perspective view of a dispenser having a safety mechanism incorporating the principles of the present invention.
FIG. 2 is an exploded perspective view of the dispenser of FIG. 1, showing the various components thereof.

The present invention is directed to a safety or trigger lock, mechanism for use on such a foam dispenser or other fluid dispensers that has an improved structure that avoids these shortcomings. Referring now to FIG. 1, a dispenser constructed in accordance with the principles of the present invention is shown generally at 10. The dispenser 10 takes the form of a gun as illustrated and includes a number of principal components, including a body portion 12 having a handle 14, a flow control valve housing 16, a nozzle recess 18, a combined nozzle latch and ejector element 20, a trigger 24, a safety 26, a biasing mechanism 28, and a pair of inlet fittings 30.

Figure 3:
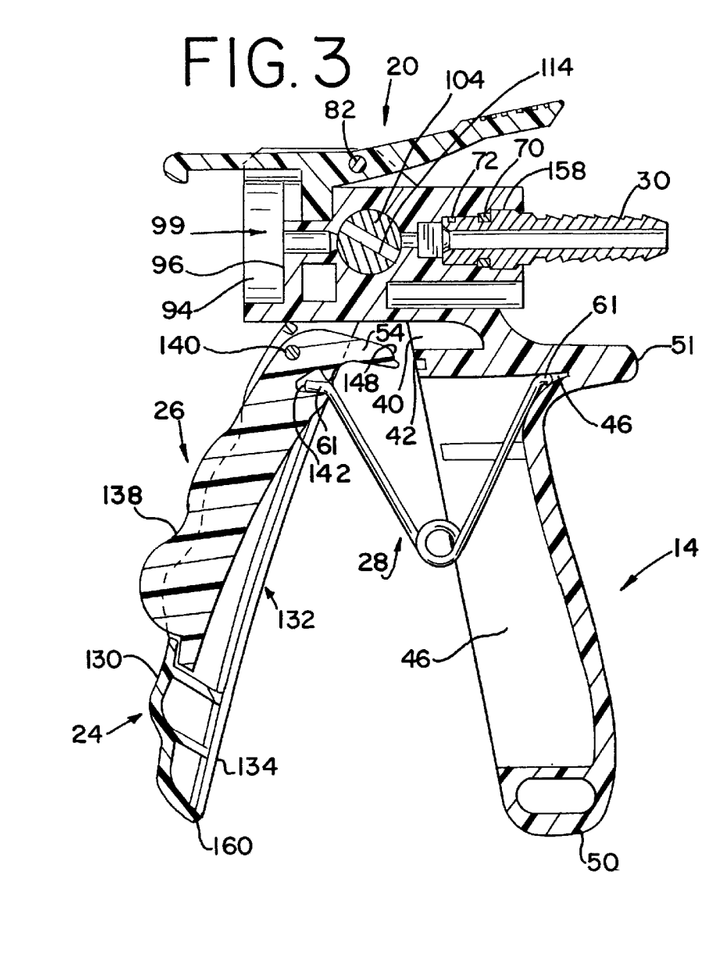
FIG. 3 is a sectional view of the dispenser of FIG. 1, showing the safety in an "on" position.
Figure 5:
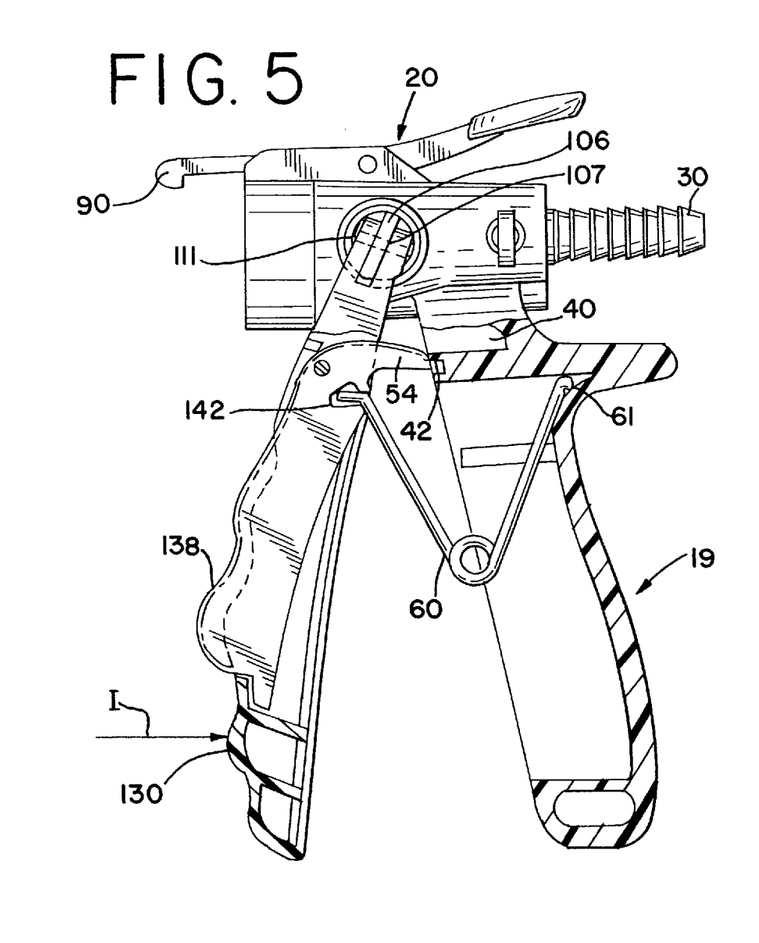
FIG. 5 is a sectional view similar to that of FIGS. 3 and 4, showing the safety or trigger lock in an "on" with the trigger stopped from full movement.
Figure 6:
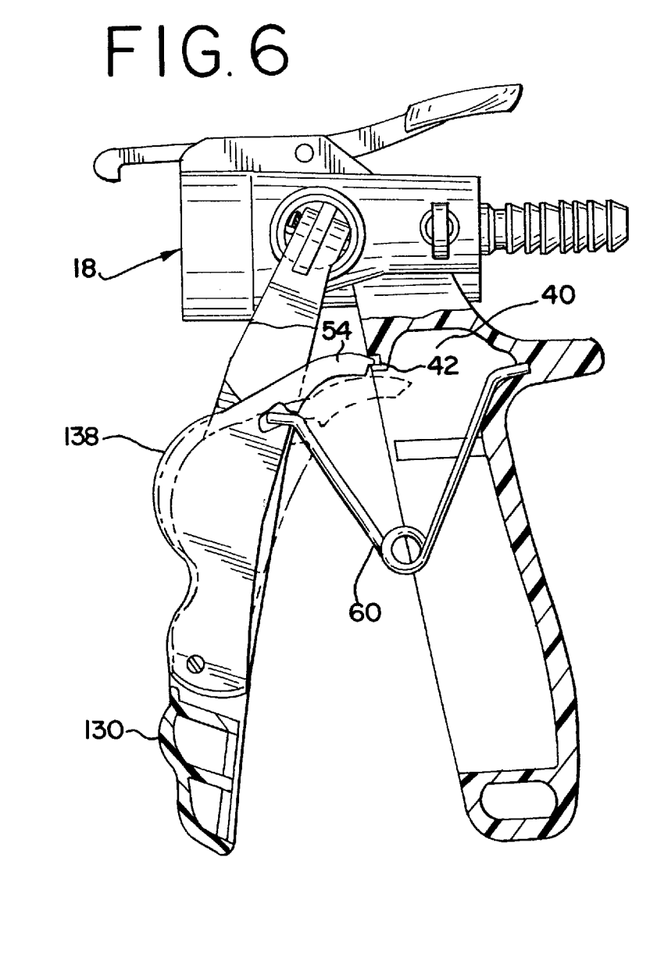
FIG. 6 is a sectional view of an alternate embodiment for dispenser constructed in accordance with the principles of the present invention and showing the safety in an "on" position.
Figure 7:
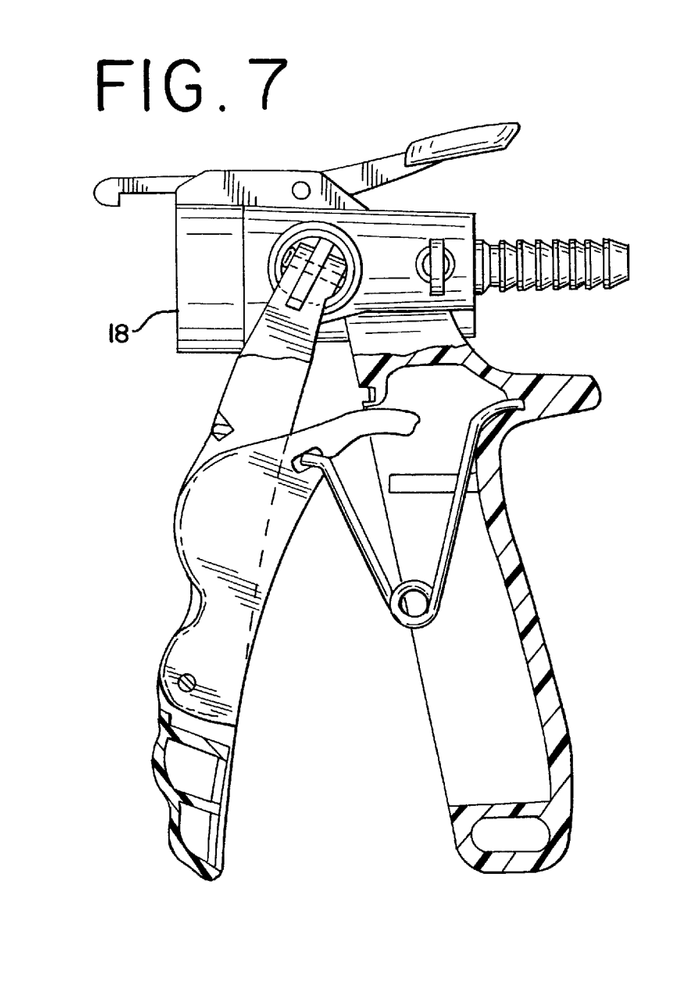
FIG. 7 is a vertical sectional view similar to that of FIG. 6, showing the safety in an "off" position and the trigger being partially depressed in its initial movement.
Figure 8:
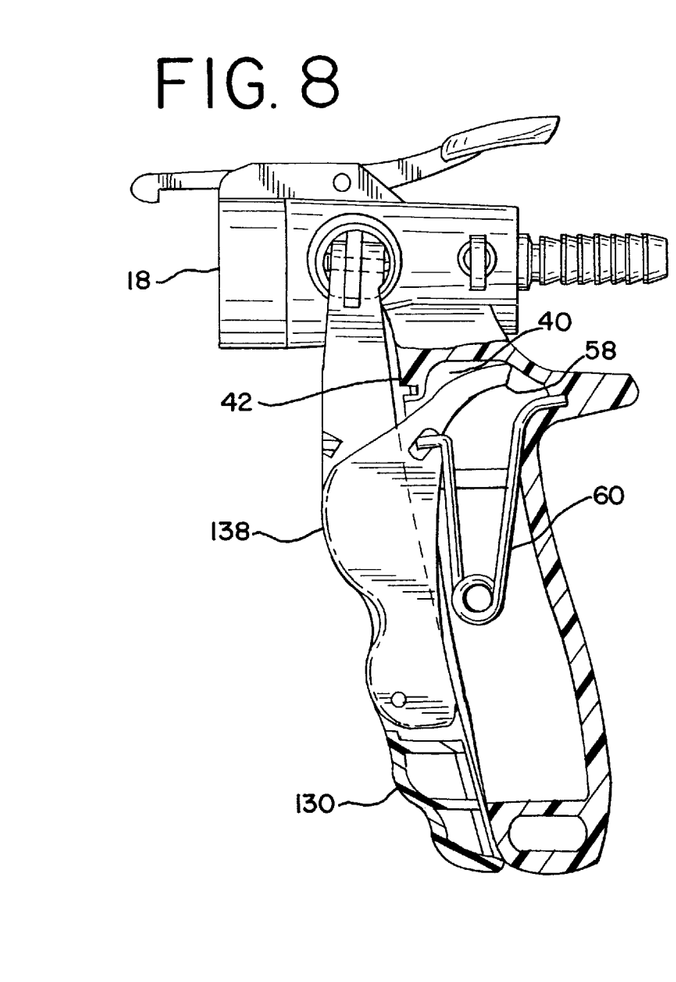
FIG. 8 is a vertical sectional view similar to that of FIGS. 6 and 7, showing the safety in an "off" position, and the trigger being fully depressed.
Figure 9:
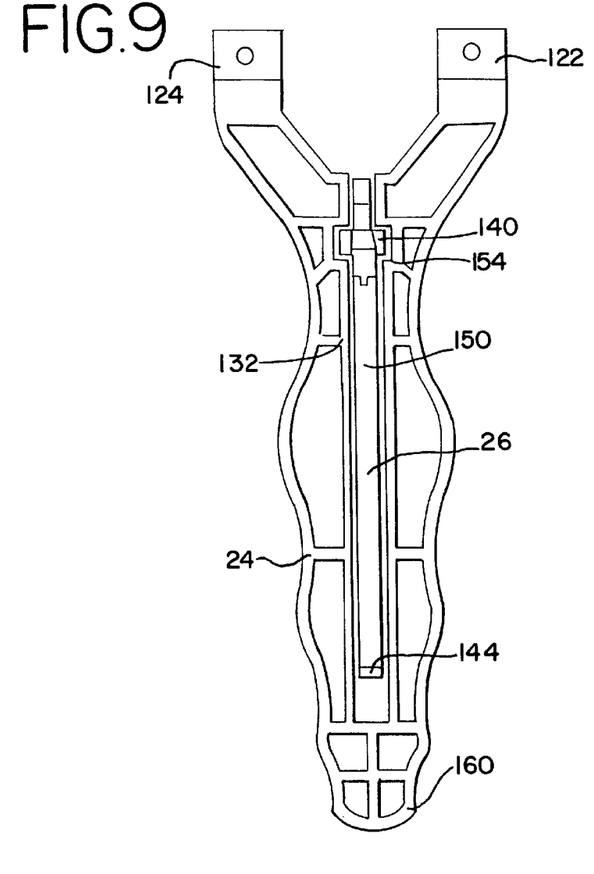
FIG. 9 is an elevational view of the trigger and safety removed from the foam dispenser; and, FIG. 10 is a side sectional view of a prior art safety mechanism incorporated into a foam dispensing gun.

In FIG. 2, the dispenser body portion 12 has its handle 14 extending away therefrom and preferably in a direction to facilitate grasping by a user. The handle 14 includes a front face 32, a rear face 34, and a pair of sides 36, 38 that interconnect the front and rear faces 32, 34. A cavity 40 located in the front face 32 of the handle 14 and is dimensioned to receive a catch 54, or arm, that extends from the safety 26 when the safety is in an "off" position (FIG. 4) for the dispensing of foam. The handle 14 also includes a stop 42 formed on its front face 32 preferably adjacent the cavity 40 either below (FIGS. 3–4) or above (FIGS. 6–8). This stop 42 is located in opposition to the safety catch 54 when the safety 26 is an "on" position, such as shown in FIGS. 3, 5 and 6. The stop 42 may be formed flush with the handle front face or as a projection on the front face. As illustrated, the stop 42 may be disposed between the cavity 40 and a cavity 44 of the handle that is formed to facilitate the molding of the handle 14. The free end 58 of the catch arm 54 has a contoured surface 59 for engaging with the stop 42 and preventing operation of the dispenser 10 irrespective of the force a user may apply to the trigger 24. A tip 56 on the free end 58 of the catch 54 locks-out the trigger 24 from inadvertent or improper operation.

When the safety 26 is in its "on" position and a user attempts to move the trigger 24 toward the handle 14 in order to operate the dispenser 10, the catch 54 will contact the stop 42, and if provided with a tip 56, the tip 56 may partially engage the receptacle 44. This engagement prevents further movement of the trigger 24 as shown in FIG. 5. This locking engagement occurs when a force is applied to the lower part 130 of the trigger 24, as would occur when the gun is dropped. Preferably, the cavity 40 is disposed above the stop 44, with the receptacle 44 below the stop 42. However, the cavity 40 may also be disposed in other embodiments below the stop 42 and the receptacle 44 is not necessary. (FIGS. 6–8.)

The handle 14 further includes a cavity 46 that receives a portion of the trigger biasing 28 shown as a return spring 60 and having a "clothespin" or hairpin configuration, operating in response to torsional forces generated in its central coil 62. Other types of springs may also be used to accomplish the function described hereinafter.

The rear face 34 of the handle 14 may be characterized by an ergonomically-shaped curvilinear surface 48 that extends from a butt end 50 to an outwardly projecting stop 51. The handle 14 is designed to be comfortable and non-fatiguing for the user, and also facilitates balance, grasping and actuation of the dispenser 10 by the user.

The upper portion of the dispenser body 12 includes a cylindrical control valve housing 16 with circular sidewalls 64 that define a cylindrical bore 66 extending transversely to the principal longitudinal axis of the housing 16. The valve housing 16 also accommodates foam component fittings 30 each of which preferably includes a locking groove 68. Each fitting 30 is secured in place against axial movement by an associated fitting lock in the preferred form of a spring clip 70. A seal member is provided in the form of an O-ring 72 and is disposed in a sealing groove 69 for establishing a fluid tight seal between the fitting 30 and the gun housing 16.

Surmounting the housing 16 is a mount 74 that includes generally parallel and slightly tapered side walls 76, 78 that hold the nozzle ejector latch member 20 when in a locking position. These sidewalls 76, 78 include an opening 80 for receiving the pivot ears 82 which attach the nozzle latch and ejector element 20 to the housing 16. This element 20 has a rocker-style lever with a finger tab 84 on one side of the pivot ears 82. Horizontal and vertical legs 86, 88 lie on the other side of the pivot ears 82. The end portion of the latching leg 86 terminates in a hook 90, while the front face 92 of the leg 88 acts to engage the rear face of a disposable nozzle. The side walls 76, 78 are spaced apart so that they snugly engage the legs 86, 88 of the latching and ejector element 20, preventing it from moving freely except under pressure exerted on the finger lever 84.

Figure 4:
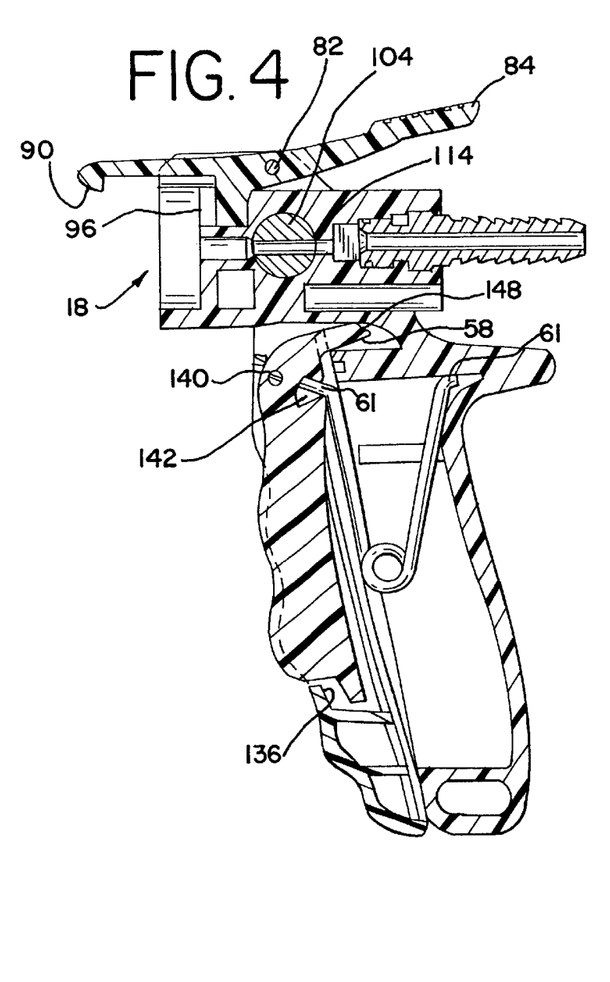
FIG. 4 is the same sectional view as FIG. 3, but showing the safety in an "off" position with the trigger fully depressed.

As shown best in FIGS. 3 and 4, the nozzle receiver assembly 18 is disposed at the forward end of the housing 16 and includes a radially inwardly facing cylindrical nozzle guide surface 94 terminating at its inner end in a front wall portion 96 which defines a mixing chamber 99. Alignment slots 98, 100 may be provided in the nozzle guide surface 94 in order to align and guide the nozzle (not shown) into a position where it is ready to accept the fluid components for mixing and dispensing.

The spool valve 104 is shown to include identical outboard ears or tabs 106, 108, each of which may be drilled with holes, as shown at 107, 109, to receive self-tapping threaded fasteners 111, 113 that connect the trigger 24 to the gun body 12 by way of the spool valve 104. The spool valve 104 is subdivided into a pair of valve elements 110, 112 each including its own component flow passage 114, 116.

A sealing means in the form of O-rings (not shown) are disposed in grooves that extend circumferentially about the spool valve 104 to subdivide it into the valve elements 110, 112. The spool 104 is rotated by movement of the trigger assembly 24. FIG. 3 illustrates the trigger 24 in a first operative position where the valve passages 114, 116 are not aligned with the inlets of the body portion 12 and foam components cannot pass through the dispenser. FIG. 4 illustrates the trigger 24 in a second operative position where valve passages 114, 116 are aligned with the inlets so that the flow components can flow directly through the dispenser and into the nozzle.

The trigger 24 includes a hand piece 120 in the form of a yoke having at its upper end, leg portions 122, 124, each of which is slotted at 126, 128 so as to receive the spool valve ears 106, 108 which are fastened thereto by fasteners 111, 113. The trigger 24 includes a contoured front grasping surface 130 that facilitates a user's gripping. A safety, or trigger lock, 26 is provided to prevent unintended operation of the trigger 24 and the dispenser 10. As shown best in FIG. 3, a slot 132 is formed in the trigger and particularly in the front surface 130 and is adapted to receive the safety 26. This slot 132 preferably extends through to the rear face 134 of the trigger. Preferably the slot 132 extends to a location of about two-thirds the longitudinal extent of the trigger 24. A user may grasp both the safety 26 and the trigger 24 with the fingers of one hand in such a configuration, so that at least two of the user's fingers may grasp and actuate the safety 26, while at least two of the user's fingers may grasp and actuate the trigger 24. In this manner, a user can easily grasp and actuate the dispenser 10 with only one hand.

The safety 26 has a contoured outer surface 138 located on its leading face, a catch 54, a pair of pivot ears 140, a groove 142 and an arm 144. The catch arm 54 extends away from the safety body in the direction of the handle 14. The free end 58 of the catch 54 is disposed in opposition to the stop 42 when the safety 26 and trigger 24 are each in their respective first operative positions. (FIG. 3.)

A pair of pins, or pivot members 140, are formed on opposing sides 150, 152 of the body of the safety and are received within a slot 154 is disposed in the rear face 134 of the trigger 24 within to facilitate movement of the safety 26 within the trigger 24. This association locates the safety actuating surface 138 a predetermined distance away from the front face 130 of the trigger 24 (under urging of the spring 28) while permitting movement of the safety 26 either clockwise or counterclockwise. (FIGS. 3–4 or 6–8).

The use of the directional terms "clockwise" or "counterclockwise" herein pertain to the rotational movement of the safety 26 around its pivot point when the dispenser is facing the direction illustrated in FIGS. 1–8 and grasped in the right hand of the user. Were the user to hold the dispenser 10 in his left hand and point the dispenser in the opposite direction, it will be understood that these directions will be reversed.

A tab arm 144 extends at the bottom 156 of the safety 26 in opposition to an endwall 136 formed as part of the slot 132 and it limits movement of the safety 24 (as shown in FIG. 3) and possible disengagement of the safety 26 from the trigger 24. A groove 142 in the safety may also be provided so as to receive a portion of the biasing spring 60.

The return spring 60 includes a central coil 62 and a pair of opposite extending arms 63, each of which terminates in a free end 61. The free ends 61 of the spring 60 interconnect the slot 46 formed in the handle 14 and the groove 142 formed in the safety 26, and thereby biases the safety and trigger into their positions shown in FIG. 3. This biasing force is transferred to the trigger 24, by way of the safety and particularly, via the pivot ears 140 and arm 144. Thus, the trigger 24 and safety 26 are normally biased away from the handle 14. The biasing means 28 also automatically resets the safety 26 and trigger 24 to this position after a user releases his pressure on the trigger and safety.

FIG. 3 illustrates the dispenser 10 in a "locked" condition where the safety 26 is in an "on" position, meaning it and the trigger 24 are biased away from the trigger so that the spool valve 104 is in a closed position. A clip 70 (FIG. 2) removably holds the inlet fittings 30 in place in a counterbore 158 of the dispenser housing 16. The fitting 30 includes an O-ring 72 set in a groove 69 that facilitates sealing of the fitting 30 within the counterbore 130 in of fluid-tight relation (FIGS. 3 and 4).

The spool valve 104 is positioned that foam components cannot flow therethrough when the trigger 24 takes its first position of FIG. 3. In this position the spool valve flow passages 114, 116 do not align with either of the adjacent inlet passages, and are blocked against foam component flow because they face interior portions of the valve bore that define the spool receiving opening 64.

FIG. 4 shows the elements referred to in connection with a description of FIG. 3 in the same relation, except that the safety 26 has been actuated, or moved to its "off" position, and the trigger 24 has been displaced toward the handle 14 against the pressure at the biasing spring 60. This movement aligns the passages of the spool valve 104 with the inlets so that the flow components can flow through the dispenser 10. Grasping of both the safety 26 and hand piece portion 120 of the trigger 24 may be accomplished by the natural articulation of the fingers on one hand of the user. Preferably, the safety 26 extends over no more than two thirds the length of the hand piece portion 120 so that the user may grasp both. When the safety 26 is moved to an "off" position, the arm member 54 no longer opposes the stop 42, but opposes the cavity 40. As the trigger 24 is moved from its first operative position (FIG. 3) to its second operative position (FIG. 4), with the safety 26 depressed and in its "off" position, the arm member 54 will be received within the handle cavity 40 so that the spool valve 104 can be moved to align the flow passages of the dispenser to dispense foam.

After a user has finished using the dispenser 10 and releases the trigger 24, the safety 26 also releases under urging of the biasing force of the return spring 60. Both the handle 14 and the safety 26 are thus returned to their first operative positions. Thus, the trigger lock mechanism of the present invention has an automatic reset feature that requires no action on the part of the user and thus has a "deadman" reset feature. It should also be noted that the movement that operates the safety is a natural "grasping" or "squeezing" movement of the user which can be done in the single motion of depressing the trigger 24, as contrasted to the complex movements required dispensers of the prior art.

As shown in FIG. 5, if a user attempts to actuate the valve 104 as described above without moving the safety 26 into its "off" position, the free end 58 of the catch 54 contacts the stop 42 and prevents further movement of the trigger. Preferably, the contoured surface 59 and tip 56 cooperate to capture the stop 42 therebetween so that no amount of additional force on the hand piece portion 120 will actuate the valve 104 without destroying the safety and/or trigger.

FIGS. 6–8 shows the elements referred to in connection with a description of FIGS. 3–5 in the generally same relation, except the mounting of the safety 26 in the trigger has been modified to reverse its rotational movement. The pivot ears 140 of the safety 26 are near the lower free end 160 of the trigger 24. The actuating surface 138 of the safety 26 still extends along and projects out from the grasping surface 130 as described above.

In this embodiment, the activating movement of the safety is reversed, i.e., it moves clockwise about its pivot members, rather than counterclockwise as in the first embodiment, when the dispenser 10 is held in the user's right hand and the dispenser is oriented in the direction shown in FIGS. 7 and 8. The orientation of the spring 60 will remain the same, having its center coil 62 disposed beneath and between the two free ends 61 of the spring 60. The spring 60 biases the safety 26 and trigger 24 away from the handle 14 where the flow passages 114, 116 of the spool valve 104 are not aligned with the inlets and wherein the safety catch arm 54 is positioned in opposition to the stop surface 42 of the handle 14. The leading edge 130 of the safety 26 protrudes past the front contour of the handle 14 so that a user may depress it. When depressed, the safety moves in the manner shown in FIG. 7 so that its arm member 54 moves out of opposition to the handle stop surface 42 and into the handle cavity 40 so that the trigger may be fully depressed to the position shown in FIG. 8, where the spool valve flow passages are aligned with the inlet passages so that foam components can flow through the dispenser.

In its preferred form, the entire dispenser just described may be made from plastic materials, with the exception of the spool, the fasteners, the trigger spring, and the fittings. A major advantage of the invention is that the safety provides a simple impediment to inadvertent or accidental operation of the spool valve and automatically resets the safety to its "on" position without additional effort from the user. This greatly simplifies operation and servicing of the gun. Additional benefits include ease of manufacture, reduction of component waste, reduction of costs, and improved worker safety.

The nozzle itself may be of a type known to those skilled in the art, that includes a series of baffles or the like to permit mixing of the foam components prior to discharge.

The spool may be manufactured in an automatic screw machine or the like, being a cylindrical spool with end tabs, transverse fluid passages and circumferential O-ring grooves. It is located in a position of registry by the yoke-type trigger, which also prevents spool end play by having its inner surfaces lying closely adjacent the outer surface of the housing 16.

In use, the remote ends of the hoses are hooked to supply tanks in a know manner. Then, it is merely necessary to insert a nozzle assembly in the dispenser. When the nozzle is fully seated, it is held in place by engagement with the latch. Thereupon, merely actuating the safety 26 while grasping the trigger 24 and moving both toward the handle performs the steps necessary to discharge a foaming plastic product through the nozzle outlet. The safety automatically resets to an "on" position after a user releases the trigger 24. Attempted further operation of the dispenser without actuation of the safety 26 will fail. The dispenser is sufficiently economical that it may be thrown away after the contents of the tanks are emptied; however, the gun may be easily cleaned and rebuilt, if desired, at low cost without the use of skilled labor.

In use, the dispenser provides the advantages of simplicity, low cost of manufacture, reduction of component waste, increased safe operation, and ease of serviceability, consequently, it provides features not found in considerably more expensive dispensers.

While the preferred embodiments of the invention have been shown and described in the context of a foam component dispenser, it will be understood that the present invention also has utility and application to other fluid dispensers, and thus, it will be apparent to those skilled in the art that changes and modifications may be made therein without departing from the spirit of the invention, the scope of which is defined by the appended claims.

We claim:

1. A dispenser for mixing together foam components to form an expandable foam and dispensing the foam, comprising:

a body portion including foam component entrances and a foam mixing chamber;

a handle extending from said body portion to facilitate grasping and operation by a user, the handle including a stop surface;

a flow control valve disposed in said body portion for controlling flow of foam components entering the dispenser mixing chamber;

a trigger pivotally mounted to said flow control valve and disposed in opposition to and spaced apart from said handle, whereby movement of the trigger opens and closes said flow control valve to respectfully permit flow of said foam components through said dispenser and prevent flow of said foam components through said dispenser; and a safety for preventing unintended operation of said dispenser, said safety being movably mounted to and extending lengthwise of said trigger, said safety having a projecting arm portion located in opposition to said handle stop surface for preventing substantial, unintended movement of said trigger sufficient to cause unintended operation of said flow control valve.

2. The dispenser of claim 1, wherein said safety further includes an actuating portion extending lengthwise past an outer surface of said trigger so that a user's fingers may grasp and actuate said safety when said trigger is depressed.

3. The dispenser of claim 1, wherein said safety is movable between first operative positions wherein said flow control valve is closed and a second operative position wherein said flow control valve is open, said dispenser further including means for biasing said safety into said first operative position, said biasing means operatively interconnecting said safety to said handle.

4. The dispenser of claim 2, wherein said safety is movably mounted to said trigger such that it moves in a counter-clockwise direction when depressed by a user and said safety arm portion moves out of opposition to said handle stop surface.

5. The dispenser of claim 2, wherein said safety is movably mounted to said trigger such that it moves in a clockwise direction when depressed by a user and said safety arm portion moves out of opposition to said handle stop surface.

6. The dispenser of claim 3, wherein when said safety is in said first operative position, said safety arm portion opposes said handle stop surface to prevent substantial movement of said trigger which would operate said flow control valve, and when said safety is in said second operative position, said safety arm portion is moved out of opposition to said handle stop surface so that said trigger may be moved for operating said flow control valve.

7. The dispenser of claim 2, wherein said safety actuating portion projects lengthwise past an exterior surface of said trigger such that both said trigger and said safety may be actuated by a user's fingers when grasping said trigger.

8. The dispenser of claim 7, wherein said safety actuating portion is disposed along a front face of said trigger.

9. The dispenser of claim 1, further including a biasing spring for biasing said trigger and said safety array from said handle.

10. A dispenser assembly for dispensing a fluid from at least one stream of fluid through an associated dispensing nozzle, the dispenser assembly comprising:

a body portion including a fluid inlet and a fluid outlet;

a handle extending from said body portion to facilitate grasping and operation by a user;

a flow control valve disposed in said body portion for controlling flow of fluid through said dispensing nozzle, a trigger disposed in opposition to and spaced apart from said handle for selectively operating said flow control valve;

a safety for preventing unintended operation of said flow control valve, the safety being mounted to said trigger and extending lengthwise of said trigger along a grasping surface thereof; and means for biasing said safety and said trigger into a first operative position away from said handle, said biasing means being interposed between said safety and said handle, wherein said means for biasing includes a spring having two opposing free ends, said free ends respectively engaging said handle and said safety.

11. The dispenser assembly as defined in claim 10, wherein said spring includes a coil spring with a coil portion interposed between said two free ends.

12. The dispenser assembly as defined in claim 11, wherein said free ends extend upwardly from said coil portion into respective engagement with said handle and said safety.

13. The dispenser assembly as defined in claim 10, wherein said handle includes a grasping surface and said trigger includes a grasping surface, said trigger grasping surface extending lengthwise along said handle grasping surface.

14. The dispenser assembly as defined in claim 10, wherein said safety is movably mounted within said trigger and said trigger is mounted to said flow control valve, said safety being mounted in said trigger beneath said flow control valve.

15. A dispenser for dispensing a fluid from a pressurized supply of fluid, the dispenser comprising:

a body portion including a fluid inlet and a fluid outlet, the body portion including a handle extending therefrom, the handle having a grasping surface for grasping by a user;

a flow control valve disposed in said body portion interposed between said fluid inlet and said fluid outlet for controlling flow of fluid through said fluid outlet, the flow control valve having at least one passage formed therein that is movable into and out of communication with said fluid inlet and outlet for permitting passage therethrough of said fluid;

a trigger for selectively operating the flow control valve, the trigger being mounted to said flow control valve and extending away from said body portion in opposition to and spaced apart from said handle and, a trigger lock for preventing unintended operation of said flow control valve, the trigger lock being pivotally mounted to said trigger and having an actuating surface extending lengthwise of said trigger along said the grasping surface of said handle.

16. The dispenser of claim 15, wherein said trigger lock includes a stop arm that projects rearwardly of said trigger lock toward said handle and said handle includes a stop surface disposed thereon in opposition to said trigger lock stop arm and said handle further includes a cavity formed therein and disposed proximate to said stop surface, whereby when a user grasps said handle and presses said trigger lock actuating surface, said trigger lock stop arm is moved out of opposition to said stop surface and into alignment with said handle cavity, thereby permitting operation of said flow control valve.

17. A dispenser for mixing together at least two fluids and discharging the mixed fluid comprising:

a dispenser body portion including at least two fluid inlets, the dispenser including a discharge nozzle, a flow control valve disposed in said body portion and interposed between said discharge nozzle and said fluid inlets for controlling flow of said fluids through said dispenser body portion and out of said discharge nozzle;

a handle extending from sail body portion to facilitate grasping of said dispenser by a user, said handle having a forward-facing stop surface and a cavity adjacent thereto;

a trigger movably mounted to said dispenser body portion and spaced apart from said handle by a spring member that exerts a biasing force on said trigger away from said handle, said trigger being capable of movement toward said handle under pressure applied thereto by a user's hand, said trigger being further operatively connected to said flow control valve so that movement of said trigger toward said handle rotates said flow control valve in one direction and opens said flow control valve to permit passage of said through said dispenser and out said discharge nozzle, while movement of said trigger away from said handle rotates said flow control valve in a direction opposite to said one direction and closes said flow control valve to prevent passage of said foam components through said dispenser and out of said discharge nozzle;

a trigger lock for preventing unintended operation of said trigger and said flow control valve, said trigger lock including an elongated lock member pivotally mounted to said trigger and extending lengthwise with respect to said trigger, the lock member having a rearward projecting arm that selectively interferes with movement of said trigger toward said handle, said trigger lock being movable between a first operative position where said arm is disposed in opposition to said stop surface and a second operative position wherein said arm is disposed in opposition to said cavity.

18. The dispenser as defined in claim 17, wherein said cavity is disposed adjacent to and above said stop surface.

19. The dispenser as defined in claim 17, wherein said cavity is disposed adjacent to and below said stop surface.

20. The dispenser as defined in claim 17, wherein said arm further includes having a free end that contacts said stop surface when said safety is in said first operative position, and said trigger is moved toward said handle to operate said flow control valve.

* * * * *